(12) United States Patent
Balaji et al.

(10) Patent No.: US 11,393,047 B2
(45) Date of Patent: Jul. 19, 2022

(54) METHODS, SYSTEMS, ARTICLES OF MANUFACTURE AND APPARATUS TO MONITOR AUDITING DEVICES

(71) Applicant: NIELSEN CONSUMER LLC, Chicago, IL (US)

(72) Inventors: Kannan Balaji, Tampa, FL (US); Pranab Pandey, New Delhi (IN); Brahmanand Reddy Shivampet, Oak Park, CA (US); Melissa Alexander, New Port Richey, FL (US); Siegfried De Smedt, Indian Rocks Beach, FL (US); Ranjit Panda, Hyderabad (IN); Jijesh Chandran, Mumbai (IN)

(73) Assignee: NIELSEN CONSUMER LLC, Chicago, IL (US)

( * ) Notice: Subject to any disclaimer, the term of this patent is extended or adjusted under 35 U.S.C. 154(b) by 172 days.

(21) Appl. No.: 16/216,693

(22) Filed: Dec. 11, 2018

(65) Prior Publication Data
US 2020/0184573 A1 Jun. 11, 2020

(51) Int. Cl.
*G06Q 50/00* (2012.01)
*H04L 51/52* (2022.01)

(52) U.S. Cl.
CPC ............ *G06Q 50/01* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 7,512,626 B2 | 3/2009 | Chitgupakar et al. |
| 7,596,507 B2 | 9/2009 | Gibson |
| 7,801,836 B2 | 9/2010 | Sureka |
| 8,406,286 B2 | 3/2013 | Liu et al. |

(Continued)

OTHER PUBLICATIONS

D. Chen and T. Li, "Computer Data Mining and Exploration of the Audit Practice," 2011, 2011 International Conference on Computer and Management (CAMAN), pp. 1-5 (Year: 2011).*

(Continued)

*Primary Examiner* — Sarah M Monfeldt
*Assistant Examiner* — Michael J. Monaghan
(74) *Attorney, Agent, or Firm* — Hanley, Flight & Zimmerman, LLC

(57) ABSTRACT

Methods, apparatus, systems and articles of manufacture are disclosed to monitor auditing devices. An example apparatus includes a workload analyzer to obtain alert data related to a potential new product from an auditing device, and a product analyzer to identify a product within the alert data to determine if the product has been previously identified by another auditing device. In response to determining that the product has not been previously identified, the example apparatus includes an alert analyzer to cluster the alert data based on characteristics associated with an auditor profile of the auditing device, and determine a probability of transmitting the alert data to other auditing devices based on the clustered alert data. The example apparatus also includes an alert authorizer to suppress the alert data from being transmitted to the other auditing devices to reduce an amount of network resources required for subsequent processing when the probability does not satisfy a threshold.

31 Claims, 6 Drawing Sheets

(56) References Cited

U.S. PATENT DOCUMENTS

| | | | |
|---|---|---|---|
| 8,521,664 B1 | 8/2013 | Lin et al. | |
| 8,712,813 B2* | 4/2014 | King | G06Q 10/0639 705/7.29 |
| 9,224,111 B2* | 12/2015 | Bowes | G06Q 10/06 |
| 10,477,363 B2* | 11/2019 | Gan | G06F 3/0482 |
| 10,521,752 B1* | 12/2019 | Williamson | G06Q 10/063114 |
| 2002/0174093 A1 | 11/2002 | Casati et al. | |
| 2003/0078846 A1 | 4/2003 | Burk et al. | |
| 2006/0106686 A1* | 5/2006 | King | G06Q 10/06 705/30 |
| 2008/0294487 A1 | 11/2008 | Nasser | |
| 2013/0051611 A1* | 2/2013 | Hicks | G06Q 10/0875 382/103 |
| 2013/0089839 A1 | 4/2013 | Drane et al. | |
| 2013/0275983 A1* | 10/2013 | Horvitz | G06F 9/4806 718/100 |
| 2014/0214628 A1 | 7/2014 | Argue et al. | |
| 2014/0379535 A1* | 12/2014 | Brief | G06Q 10/087 705/28 |
| 2017/0005962 A1* | 1/2017 | Lewin-Eytan | H04L 51/12 |
| 2017/0061416 A1* | 3/2017 | Morate | G06F 16/51 |
| 2017/0178060 A1* | 6/2017 | Schwartz | G06V 10/44 |
| 2017/0193425 A1* | 7/2017 | Roman | H04L 67/325 |
| 2017/0249574 A1* | 8/2017 | Knijnik | G06Q 10/06314 |
| 2017/0255891 A1* | 9/2017 | Morate | G06V 20/52 |
| 2017/0372038 A1* | 12/2017 | Gupta | G16H 20/60 |
| 2018/0063196 A1* | 3/2018 | Foley | H04L 63/20 |
| 2018/0114456 A1* | 4/2018 | Black | G09B 7/00 |
| 2018/0189664 A1* | 7/2018 | Hegde | G06F 9/542 |
| 2018/0365616 A1* | 12/2018 | Taylor | G06Q 10/06316 |
| 2019/0164097 A1* | 5/2019 | Gupta | G06N 20/00 |

OTHER PUBLICATIONS

N. Gehrke and P. Wolf, "Towards Audit 2.0—A Web 2.0 Community Platform for Auditors," 2010, 2010 43rd Hawaii International Conference on System Sciences, pp. 1-10 (Year: 2010).*

C. Yan, B. Li, Y. Vorobeychik, A. Laszka, D. Fabbri and B. Malin, "Get Your Workload in Order: Game Theoretic Prioritization of Database Auditing,"2018, 2018 IEEE 34th International Conference on Data Engineering (ICDE), pp. 1304-1307 (Year: 2018).*

* cited by examiner

METHODS, SYSTEMS, ARTICLES OF MANUFACTURE AND APPARATUS TO MONITOR AUDITING DEVICES

FIELD OF THE DISCLOSURE

This disclosure relates generally to product auditing, and, more particularly, to methods, systems, articles of manufacture and apparatus to monitor auditing devices.

BACKGROUND

Employees (e.g., auditors) of auditing entities visit stores and collect information about products in the stores. The auditors collect information such as the price of a product and the number of units of the product available in a store. The information from the auditors is used to generate reports that are provided to clients of the auditing entities.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
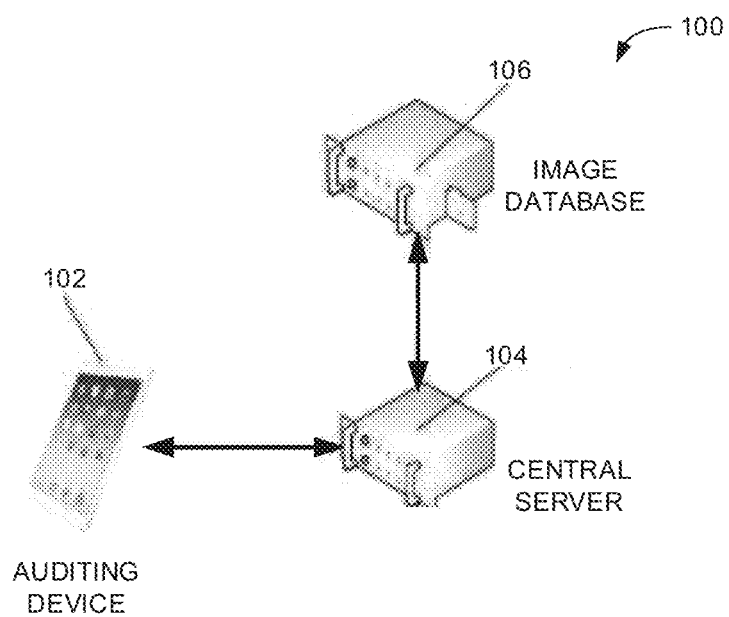
FIG. 1 is a schematic illustration of an example environment in which an example auditing device constructed in accordance with the teachings of this disclosure is to perform auditing tasks.

Product manufacturers, markets, distributors, and others (e.g., clients) wish to track and research how products are made available and sold in a market of interest (e.g., stores, merchants, retailers, etc., generally referred to herein as "stores"). For example, a soft drink manufacturer client to track the circumstances related to sales of their products and/or other products available on the market at one or more stores in a region. As such, the client may request an audit be performed in a particular location (e.g., a grocery store, a department store, a building supply store, a warehouse, a food pantry, a purchasing clubs (e.g., Costco®), etc.). The request may include information about any number of products that is desired to be audited. For example, clients may request information about the location of products in stores, the number of products in stores, the number of products in facings (e.g., the number of products displayed at the front of a shelf) in stores, the price of products in stores, the existence of promotional pricing in stores, the type of exhibition of products (e.g., in a basket, on an end cap, on an island, in an aisle, etc.), etc. The request of the clients may specify a single product, multiple products from a producer/manufacturer, multiple products of a particular type (e.g., products in the soft drink category), etc. The request may also specify a geographical region, particular stores, and/or any other type(s) of information about the areas from which the information should be gathered to satisfy the request. The request may specify any level of granularity such as, for example, information about stock-keeping unit (SKU) numbers, information about products by product regardless of the product size (e.g., grouping 10 ounce, 12 ounce, 16 ounce, and 24 ounce sizes together), information about products by producer/manufacturer (e.g., grouping all products from a particular producer/manufacturer), etc.

As such, an auditing entity may receive the requests from the client d generate workloads which are subsequently distributed to auditors for performing an audit to collect images, and facts and/or data about products. As used herein, "workload" may be any type of instruction to collect information including instructions to collect an image of a product, collect an image of a shelf (e.g., a shelf of products of a specified type), collect a fact (e.g., Input a price. Input a location. Input a number of products), an instruction to input an opinion (e.g., Identify the product most prominently displayed?), an interrogative sentence (e.g., What is the product nearest the entrance?), a batch of data collection tasks etc.

In some examples, the auditors are agents of the auditing entity and visit the stores and perform workloads requested by the clients. The auditors utilize handheld computing devices (e.g., auditing devices) to perform the workloads while visiting the stores, and to wirelessly transmit information (e.g., images, facts, opinions, etc.) to a central server discovered while performing the workloads. The auditors are also connected to other auditors via an auditor social network. The auditors may communicate with one another regarding certain request in one or more workloads, new products discovered, updated locations of advertisements, etc. In addition, auditors may generate messages or alerts which may be transmitted to other auditors regarding new products or other information of interests to auditors. However, these messages and alerts are often sent repetitively (e.g., the same message or alert is sent by multiple auditors), which causes undue hardship on a processor of the auditing devices and/or a central server, and causes auditors to re-audit workloads which have already been performed.

Examples disclosed herein analyze messages and alert data from auditors to determine if the messages and alert data are to be suppressed to reduce an amount of network, computational and/or personnel resources required for auditing activities. For example, an auditor may identify a new product while performing a workload. The auditor may take a picture of the potentially new product and submit it to a central server to be transmitted to other auditors. The example central server may analyze the potential new product and determine that the product has been previously identified. In the event the product has been previously identified, then further personnel efforts to locate the product during one or more subsequent auditing tasks may be wasteful. Similarly, in the event the product has been previously identified and one or more other auditors continue to generate audit entry data for that product, then such additional audit entry data is duplicative, thereby wasting computational resources to store, wasting storage resources, and wasting network bandwidth. As such, the central server may suppress the alert data to reduce the amount of resources (e.g., network, computer, storage, etc.) required for transmitting such an alert to other auditors.

In some examples, the central server 104 may determine that the product has not been previously identified. For example, the product does not exists in a product reference image database. As such, the central server 104 may cluster the alert data based on characteristics associated with the auditor. The central server 104 clusters based on characteristics of auditors because some auditors may per form better than others (e.g., more efficient, more accurate, etc.). As such, clustering based on auditor characteristics increases a computational efficiency of the central server 104 by identifying characteristics of auditors that are more reliable. In some examples, the characteristics may include a skill level of the auditor and/or a rate of false alert data (e.g., a majority of the auditor's alerts are suppressed). The example central server 104 may determine a probability of transmitting the alert data to other auditors based on performing a logistic regression, which results in a probability indicative of a degree of reliability and/or accuracy from the auditor, for example. The resulting probability is compared to a threshold and the central server subsequently determines whether to transmit the alert data or suppress the alert data to reduce an amount of network resources required for subsequent processing, for example.

FIG. 1 is a block diagram of an example environment 100 in which an example auditing device 102, constructed in accordance with the teachings of this disclosure, operates to execute workloads in a store. In the illustrated example of FIG. 1, the auditing device 102 is a smartphone. However, in other examples, the auditing device 102 can be, for example, a mobile device, a tablet, a laptop computer, and/or any other suitable device. The example auditing device 102 of FIG. 1 is described in further detail in connection with FIG. 2 below.

The example environment 100 of FIG. 1 includes an example central server 104 commutatively coupled to the auditing device 102 to synchronize and/or process information corresponding to the auditing device 102. In some examples, the example central server 104 communicates with the auditing device 102 via a wireless Internet network. Additionally or alternatively, in some examples, the central server 104 communicates with the auditing device 102 using any other suitable communication protocol, including but not limited to, a cellular network, a data network, Bluetooth, Radio-Frequency Identification (RFID), Near Field Communication (NFC), a wired Internet connection, etc. In some examples, audit data and/or results are communicated between the central server 104 and the auditing device 102. For example, the central server 104 transmits workloads to the auditing device 102. In some examples, the auditing device 102 transmits reported results (e.g., image-based results and/or fact-based results) to the central server 104.

In some examples, the illustrated environment 100 of FIG. 1 includes an image database 106. In some examples, the central server 104 is in communication with the image database 106 via a wired and/or wireless network. In some examples, the central server 104 synchronizes data and/or images between the example image database 106 and the example auditing device 102. Additionally or alternatively, in some examples, the auditing device 102 is in direct communication with the image database 106. In some examples, the auditing device 102 transmits reported image-based results and/or point of sale images to the central server 104 and/or the image database 106. In some such examples, the central server 104 communicates the image-based results and/or point of sale images from a workload to the central server 104 and/or the image database 106. In some examples, the auditing device 102 transmits the image-based results and/or the point of sale images in response to obtaining the image-based results and/or the point of sale images while executing a workload. In other examples, the auditing device 102 delays transmittal of the image-based results and/or the point of sale images until the auditing device 102 is in communication with the central server 104 via a network connection (e.g., such as a wireless and/or wired Internet connection In some examples, the image database 106 transmits point of sale images to the auditing device 102 and/or the central server 104. In some examples, the image database 106 is in communication with the central server 104, and/or the auditing device 102 via any wired or wireless connection. In some examples, the example image database 106 is implemented by a server. Additionally or alternatively, the image database 106 can be implemented by, for example, a mass storage device, such as a hard drive, a flash disk, a flash drive, etc.

Figure 2:
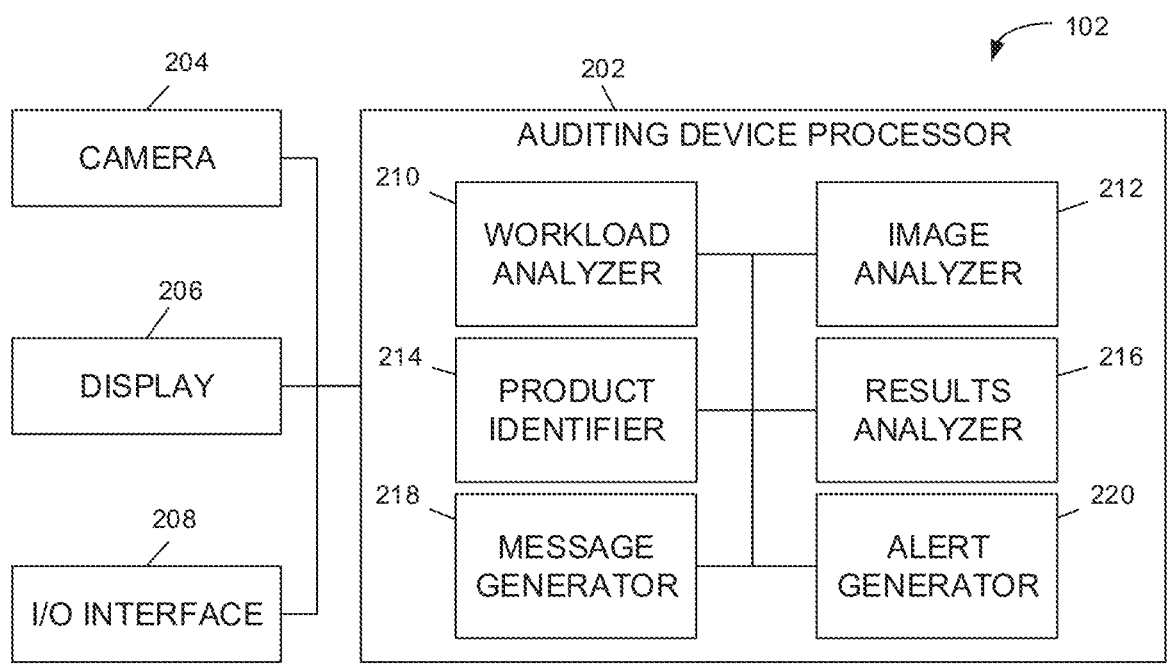
FIG. 2 is a schematic illustration of an example implementation of the auditing device of FIG. 1.

FIG. 2 is a block diagram of an example implementation of the auditing device 102 of FIG. 1. In the illustrated example of FIG. 2, the auditing device 102 includes an example auditing device processor 202 structured to enable the auditing device 102 to execute a workload interactively. In some such examples, the auditing device processor 202 is operatively coupled to additional components/structure of the auditing device 102, such as an example camera 204, an example display 206, and/or an input/output (I/O) and/or other communication interface 208 via a bus.

In the illustrated example of FIG. 2, the auditing device 102 includes the example camera 204 operatively coupled to the auditing device processor 202. In some examples, the camera 204 captures images) and communicates the image to the auditing device processor 202. In some examples, the camera 204 is capable of scanning barcodes to provide additional input related to products in the image(s), and may communicate the barcodes to the auditing device processor 202.

The example auditing device 102 of FIG. 2 includes the example display 206 operatively coupled to the auditing device processor 202. The display 206, in some examples, presents instructions from a workload and/or results subsequent execution of a workload to the auditor via a user interface (e.g., an interactive and/or graphical user interface) implemented by the example auditing device processor 202 of the auditing device 102. In some examples, the display 206 is a touchscreen to simplify interaction between the auditing device 102 and the auditor when providing input related to the displayed results. In some examples, the auditor provides input in response to prompts on the display 206 communicated via the user interface. In some examples, the auditor provides input to correct errors in the results of executing a workload presented to the auditor on the display 206 via the user interface.

In some examples, the auditing device 102 includes the example input/output (I/O) interface 208 operatively coupled to the processor 202. The I/O interface 208 is operative to communicate with, in some examples, the central server 104, and/or the image database 106 of FIG. 1. In some examples, the I/O interface 208 is operative to interactively communicate with the auditor using, for example, the display 206, a button on the auditing device, a voice command, a gesture, a sensor to receive input from the auditor, etc. In some such examples, the I/O interface 208 enables the auditor to provide input to the user interface, via the display 206, related to image(s), workloads, and/or the results displayed to the auditor.

An example implementation of the auditing device processor 202 of the example auditing device 102 is also depicted in FIG. 2. In some examples, the example auditing device processor 202 of the auditing device 102 includes an example workload analyzer 210, an example image analyzer 212, an example product identifier 214, an example results analyzer 216, an example message generator 218, and an example alert generator 220, which communicate via a bus. In some examples, the workload analyzer 210 is a means for analyzing a workload, or a workload analyzing means. In some examples, the image analyzer 212 is a means for analyzing an image, or an image analyzing means. In some examples, the product identifier 214 is a means for identifying a product, or a product identifying means. In some examples, the results analyzer 216 is a means for analyzing results, or a results analyzing means. In some examples, the message generator 218 is a means for generating a message, or a message generating means. In some examples, the alert generator 220 is a means for generating an alert, or an alert generating means.

In the illustrated example of FIG. 2, the workload analyzer 210 receives and/or retrieves workloads from the central server 104 relating to tasks that are to be completed during an audit. The example workload analyzer 210 analyzes the workload information to determine which tasks are to be completed. For example, the workload analyzer 210 retrieves a workload that includes tasks to obtain images of certain products as well as analyze product advertisement displays within a store. As such, the example workload analyzer 210 determines that the tasks related to the product advertisement displays are to be completed first based on a workload task hierarchy (e.g., product displays are to be completed to prior to obtaining images). The example workload analyzer 210 subsequently displays the product advertisement display tasks to an auditor via the display 206 so the auditor may perform the tasks of the workload. Additionally, the example workload analyzer 210 retrieves messages and alert data from the central server 104 pertaining to an updated task that is to be completed. For example, another auditor may identify a new product that was not previously identified in a workload for a specific geographic region. As such, the auditor may send a message and/or an alert to other auditors within that geographic region via the central server 104 so that the other auditor's workloads can be updated to collect such information to avoid having to re-audit the same store/products. The example workload analyzer 210 of FIG. 2 maintains a record of the tasks and when they are completed. For example, the workload analyzer 210 displays a task for an auditor to perform (e.g., take a photo of a certain product) and retrieves a response (e.g., via input on the display 206 and/or upload of an image) from the auditor. The example workload analyzer 210 records that task as complete and displays one or more tasks from the workload for the auditor to complete. The example workload analyzer 210 continues this process until the entire workload(s) has/have been executed and/or otherwise performed.

When the workload includes image based results, the example image analyzer 212 analyzes the images to determine the products in the image. For example, a workload may contain a task to obtain an image relating to a product of interest. The auditor may obtain the image based on prompts from the example workload analyzer 210, and the example image analyzer 212 subsequently analyzes the image to determine if the image is of the correct product. In some examples, the image analyzer 212 accesses the image database 106 to determine if a match exists (e.g., the image matches an image of a product in the image database 106). In some examples, the image analyzer 212 identifies the product in the image based on a match in the image database and transmits an indication of the product to the product identifier 214 and/or the results analyzer 216 for further processing. In some examples, the indication may include a name of the product if the product was identified in the image database 106, or an indication of an unknown product if the product in the image was not identified.

The results from the example workload analyzer 210 and the example image analyzer 212 are transmitted to the example product identifier 214 for further analysis. The example product identifier 214 of FIG. 2 identifies products that were scheduled and/or otherwise planned to be identified in the workload from the workload analyzer 210 as well as products that were scheduled and/or planned to be identified in the images from the image analyzer 212. For example, the product identifier 214 determines that product A was scheduled and/or planned to be identified (e.g., from a task of the workload), but an indication from the image analyzer 212 identifies product B. The example product identifier 214 marks an error for that specific task and proceeds to analyze other tasks within the workload in a similar manner. In some examples, an auditor identifies a new product while executing a workload and obtains an image of the new product. In this example, the image analyzer 212 provides an indication of unknown (e.g., metadata) along with the image because the product may not yet be in the image database 106 (e.g., a reference image of the product has not been generated). As such, the example product identifier 214 flags the image and/or the task as message or alert ready (e.g., provide an indication to the message generator 218 and/or the alert generator 220 to generate an alert to transmit to other auditors).

Following the identification of the products, the example results analyzer 216 determines a success rate associated with a workload of interest (e.g., the workload currently being analyzed). For example, the results analyzer 216 analyzes each task and determines if each task was completed successfully or whether an error occurred (e.g., the example product identifier 214 identified that the wrong product image was obtained). The example results analyzer 216 subsequently calculates the success rate (e.g., 70/100=70% tasks completed successfully) and determines if the success rate meets a success rate threshold (e.g., 90%, 85%, 70%, etc.). In some examples, the results analyzer 216 prompts an auditor to re-audit the tasks for which an error occurred before the auditor leaves the store to obtain a 100% success rate. Alternatively, the example results analyzer 216 determines that the success rate was within a threshold and may not prompt the auditor to re-audit the tasks that received an error. The example results analyzer 216 generates a report associated with the workload(s) and the auditor that executed the workload(s), which includes the success rate so that metrics (e.g., time to execute workload, success rate of workload, etc.) may be determined for the auditor at the central server 104.

The illustrated example of FIG. 2 includes the message generator 218 to generate messages for transmission to other auditing devices 102. For example, when an auditor identifies a new product, the message generator 218 generates a message which is subsequently transmitted to other auditors via the central server 104. The example message generator 218 includes an image of the product which was obtained by an auditor of the auditing device 102 and/or any text that auditor includes product name form label, a question to see if any other auditors have identified this product, etc.). The example message generator 218 is utilized to generate any type of message that an auditor desires to send to other auditing devices 102 within an auditing device 102 network (e.g., a geographic region, all auditing devices for a particular skill level, etc.).

The example alert generator 220 generates alert data to alert other auditors that a new product has been identified and needs to be audited prior to the auditor completing the auditor's workload. Such transmission of alert data allows auditors to obtain audit data without requiring another auditor to re-audit the store, thus saving money and resources for auditing entities. In the illustrated example of FIG. 2, the alert generator 20 retrieves information regarding potential alerts from the workload analyzer 210, the image analyzer 212, the product identifier 214, the results analyzer 216, and/or the message generator 218. For example, the alert generator 220 retrieves an indication from the product identifier 214 that a new product has been identified and needs to be appended to workloads in a geographic area. The example alert generator 220 subsequently generates alert data which is re-directed to the other auditing devices 102 via the central server 104. The alert data is re-directed to the other auditing devices via the central server 104 to avoid multiple alerts being transmitted about the same product, which saves network resources, storage space, and reduces processing cycles.

Figure 3:
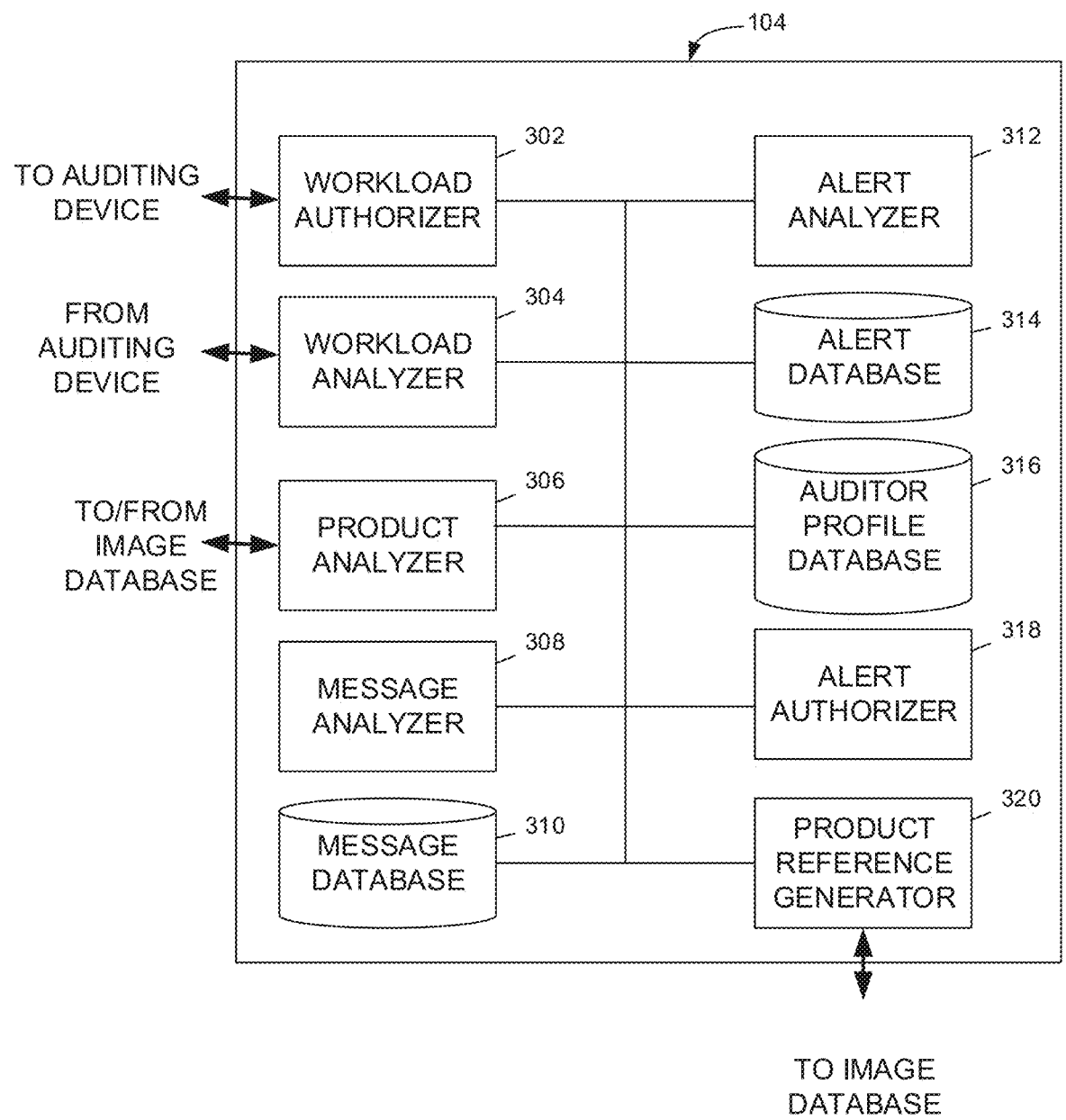
FIG. 3 is a schematic illustration of an example implementation of the central server of FIG. 1.

An example implementation of the central server 104 is illustrated in FIG. 3. In some examples, the example central server 104 includes an example workload authorizer 302, an example workload analyzer 304, and example product analyzer 306, an example message analyzer 308, an example message database 310, an example alert analyzer 312, an example alert database 314, an example auditor profile database 316, an example alert authorizer 318, and an example product reference generator 320, which communicate via a bus. In some examples, the workload authorizer 302 is a means for authorizing a workload, or a workload authorizing means. In some examples, the workload analyzer 304 is a means for analyzing a workload, or a workload analyzing means. In some examples, the product analyzer 306 is a means for analyzing a product, or a product analyzing means. In some examples, the message analyzer 308 is a means for analyzing a message, or a message analyzing means. In some examples, the alert analyzer 312 is a means for analyzing an alert, or an alert analyzing means. In some examples, the alert authorizer 318 is a means for authorizing an alert, or an alert authorizing means. In some examples, the product reference generator 320 is a means for generating a product reference, or a product reference generating means.

In the illustrated example of FIG. 3, the workload authorizer 302 generates workloads for completion by auditors based on requests from clients. For example, the workload authorizer 302 receives and/or otherwise retrieves requests to audit a product of interest. The example workload authorizer 302 generates a workload including tasks associated with the product of interest. In some examples, the workload authorizer 302 obtains requests from a client that exceeds a workload threshold (e.g., cannot be performed because not enough hours in the day, too far for auditor to travel, too many audit stops in view of auditor efficiency metrics, etc.). As such, the workload authorizer 302 may suppress the requests and not generate a workload. In some examples, the workload authorizer 302 authorizes workloads based on characteristics associated with an auditor. For example, the workload authorizer 302 may access the auditor profile database 316 and determine a skill level associated with an auditor and suppress any tasks on a workload that are not within the auditors skill level. The workload authorizer 302 transmits the workloads to the auditing devices 102 for execution.

The example workload analyzer 304 obtains reports from the results analyzer 304 regarding a success rate of a certain workload. The example workload analyzer 304 analyzes the report and updates an auditor profile that executed the workload in the auditor profile database 316. For example, the workload analyzer 304 may identify the auditor associated with the executed workload, obtain the auditor profile form the auditor profile database 316, and update metrics (e.g., time to execute audit, success rate, etc. associated with the auditor profile. The example workload analyzer 304 may also obtain alert data related to a potential new product from an auditing device 102. In some examples, the workload analyzer 304 determines if the product in the alert data is associated with another workload of another auditing device 102. The workload analyzer 304 of the illustrated example may transmit a determination to the alert authorizer 318 to suppress the alert data from being transmitted if the workload analyzer 304 determines that another auditing device 102 is executing a workload that includes the product identified in the alert data. In some examples, the workload analyzer 304 may determine that the product in the alert data is not associated with another workload and may transmit a determination to the product analyzer 306.

The example product analyzer 306 receives and/or otherwise retrieves the determination from the workload analyzer 304 that the product in the alert data is not associated with another workload. In some examples, when the alert data from the auditing device 102 includes an image, the product analyzer 306 accesses the image database 106 to determine if a product reference image matches the image of the product in the alert data. If the example product analyzer 306 identifies a match (e.g., a product that has already been identified), the product analyzer 306 transmits a determination to the alert authorizer 318 to suppress the alert data from being transmitted to the other auditing devices 102. In examples where the alert data does not include an image and only includes a message (e.g., name of a label on product), the product analyzer 306 may transmit the alert data to the message analyzer 308 for further processing.

The message analyzer 308 of the illustrated example parses messages from other auditing devices to determine if the product in the alert data has been previously identified. For example, the message analyzer 308 may analyze messages in the message database 310 to determine if any other messages include a product name similar to the product identified in the alert data. The example message analyzer 308 may utilize any type of text recognition algorithm to identify potential matches. In some examples, the message analyzer 308 identifies a match within the message database 310 and transmits an indication message to the product analyzer 306 indicating that the product has been identified in the messages from other auditing devices 102. In some examples, the message analyzer 308 may not identify the product within the message database 310 and may transmit an indication to the alert analyzer 312.

The example alert analyzer 312 analyzes the alert data to determine whether or not to suppress the alert data or transmit the alert data to other auditing devices 102. The example alert analyzer 312 accesses other alert data within the alert database 314 to determine if the alert data has been previously transmitted to the auditing devices 102. If the example alert analyzer 312 determines that the alert data has been previously transmitted to the other auditing devices 102, the alert analyzer 312 transmits an indication message to the example alert authorizer 318 to suppress the alert data. The example alert analyzer 312 further analyzes the alert data if no match was identified in the alert database 314. The alert analyzer 312 of the illustrated example clusters the alert data based on characteristics associated with an auditor profile of the auditing device 102. In some examples, the alert analyzer 312 accesses an auditor profile from the auditor profile database 316 and accesses characteristics associated with the auditor profile, which may include a number of years of experience, a skill level, an efficiency measure, an average amount of time to perform an audit, an alert data generation measure, a number of stock keeping units (SKU), etc. The example alert analyzer 312 may determine a cluster index (i) for each characteristic associated with the auditor profile (e.g., cluster 1 is skill level, cluster index 2 is an efficiency measure, etc.). The alert analyzer 312 performs a logistic regression to learn coefficients (a(i,m)) associated with a cluster index (i) to determine a probability (p(i)) of transmitting the alert data for a specific cluster index (i). In some examples, the alert analyzer 312 performs the logistic regression in a manner consistent with example Equation 1. Additionally, the alert analyzer 312 determines the probability of transmitting the alert data for a cluster index (i) where x represents audit variables (e.g., audit time, total number of SKUs, etc.) in a manner consistent with example Equation 2.

$$Y(i)=a(i,1)+(a(i,2)x2+ \ldots +a(i,m)x(m) \qquad \text{Equation 1:}$$

$$p(i)=\exp(Y(i)/[1+\exp(Y(i))] \qquad \text{Equation 2:}$$

The alert analyzer 312 obtains the resulting probabilities (p(i)) for each cluster index (i) and transmits the resulting probabilities for each cluster to the alert authorizer 318 for further processing.

The example alert authorizer 318 obtains the probabilities (p(i)) for each cluster index (i) and determines whether the probabilities satisfy a threshold. The example alert authorizer 318 compares each probability to a probability threshold (e.g., 70%, 80%, 90%, etc.) and determines whether to suppress or transmit the alert data to other auditing devices 102 to reduce an amount of network resources required for subsequent processing. In some examples, the alert authorizer 318 determines that the probability associated with a skill level index satisfies a threshold, but the probability associated with an efficiency measure does not satisfy the threshold. As such, the example alert authorizer 318 transmits the alert data to other auditing devices 102 associated with the skill level index (e.g., 1 year of experience), and suppresses the alert data from being transmitted to other auditing devices associated with the efficiency measure index to reduce an amount of network resources required for subsequent processing of transmitting the alert data to the other auditing devices 102.

The example product reference generator 320 utilizes images from the alert data to generate a product reference image that is subsequently stored in the image database 106. For example, when alert data includes an image, and satisfies the probability threshold of the alert authorizer 318, the product reference generator 320 generates a product reference image which includes the image from the alert data and a product name from the alert data. In some examples, the product reference generator 320 prompts an auditor via the display 206 to enter and/or verify a product name for the image prior to generating the product reference image. In some examples, the product reference image is authorized by a manager of the central server 104.

While an example manner of implementing the auditing device 102 of FIG. 1 is illustrated in FIGS. 1 and 2, one or more of the elements, processes and/or devices illustrated in FIGS. 1 and 2 may be combined, divided, re-arranged, omitted, eliminated and/or implemented in any other way. Further, the example workload analyzer 210, the example image analyzer 212, the example product identifier 214, the example results analyzer 216, the example message generator 218, the example alert generator 220 and/or, more generally, the example auditing device 102 of FIG. 1 may be implemented by hardware, software, firmware and/or any combination of hardware, software and/or firmware. Thus, for example, any of the example workload analyzer 210, the example image analyzer 212, the example product identifier 214, the example results analyzer 216, the example message generator 218, the example alert generator 220 and/or, more generally, the example auditing device 102 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload analyzer 210, the example image analyzer 212, the example product identifier 214, the example results analyzer 216, the example message generator 218, and the example alert generator 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example auditing device 102 of FIGS. 1 and 2 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
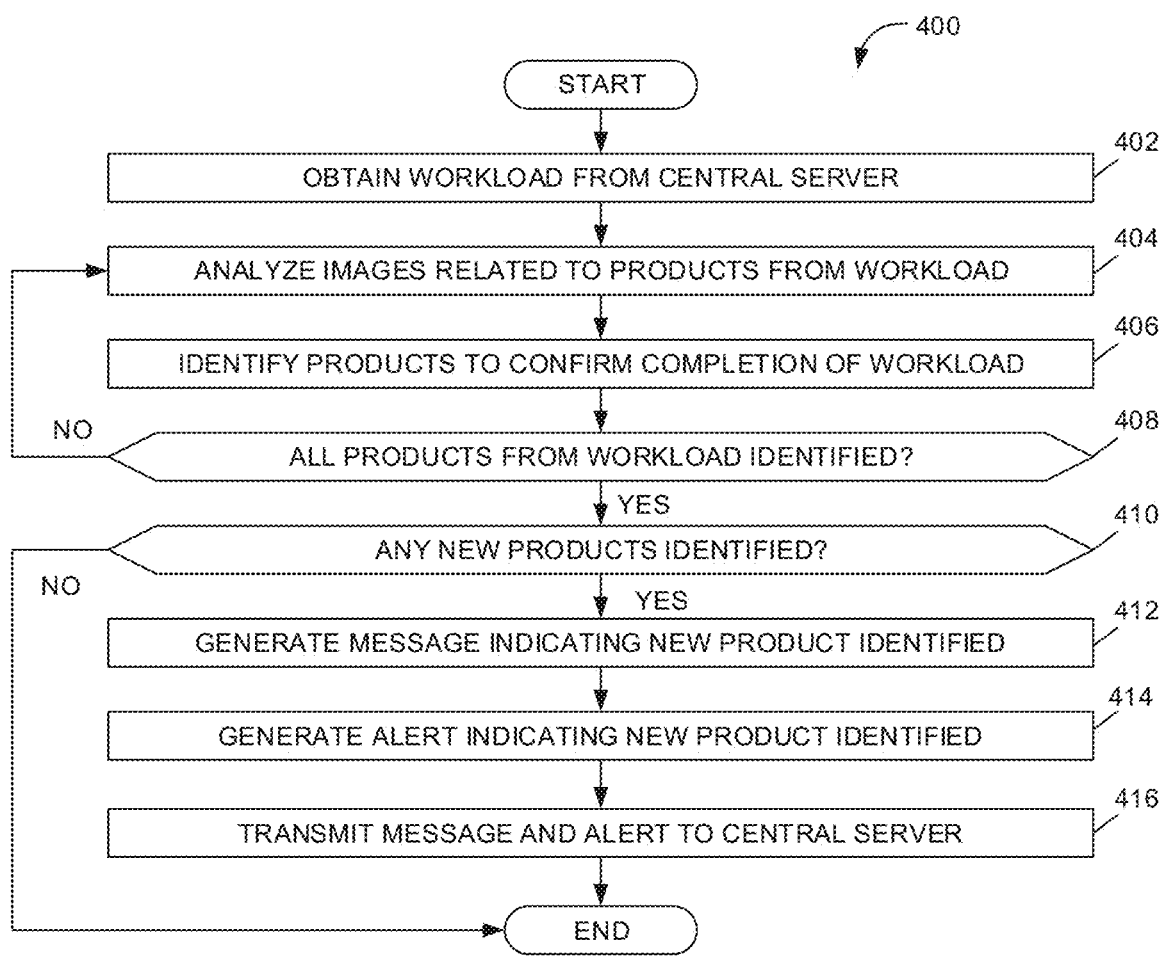
FIG. 4 is a flowchart representative of example machine-readable instructions that may be executed by the example auditing device of FIGS. 1 and/or 2.

A flowchart representative of example hardware logic, machine readable instructions, hardware implemented state machines, and/or any combination thereof for implementing the auditing device 102 is shown in FIG. 4. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example auditing device 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Example machine readable instructions that may be executed to implement the auditing device 102 of FIGS. 1 and/or 2 are illustrated in FIG. 4. With reference by example to FIG. 2, the example machine readable instructions (e.g., process 400) of FIG. 4 begin when the example workload analyzer 210 obtains a workload from the central server 104 (block 402). The example workload analyzer 210 initiates an auditor to perform the workload. The example image analyzer 212 analyzes images related to products from the workload (block 404). For example, the image analyzer 212 accesses images obtained from the camera 204 and access images from the image database 106 to identify a reference product image match. The example product identifier 214 identifies products to confirm completion of the workload (block 406). The example product identifier 214 determines if all the products from the workload have been identified (block 408). If the product identifier 214 determines that not all of the products have been identified (block 408), the example process 400 returns to block 404. If the example product identifier 214 determines that all products in the workload have been identified (block 408), the product identifier 214 determines if any new products have been identified (block 410). If the product identifier 214 determines that no new products have been identified (block 410), the example process 400 ends. If the example product identifier 214 determines that a new product has been identified (block 410), the message generator 218 generates a message indicating a new product identified (block 412). The example alert generator 220 generates an alert indicating the new product has been identified (block 414), and transmits the message and alert data to the central server 104 (block 416). In some examples, the process 400 ends until another workload is to be processed.

Figure 6:
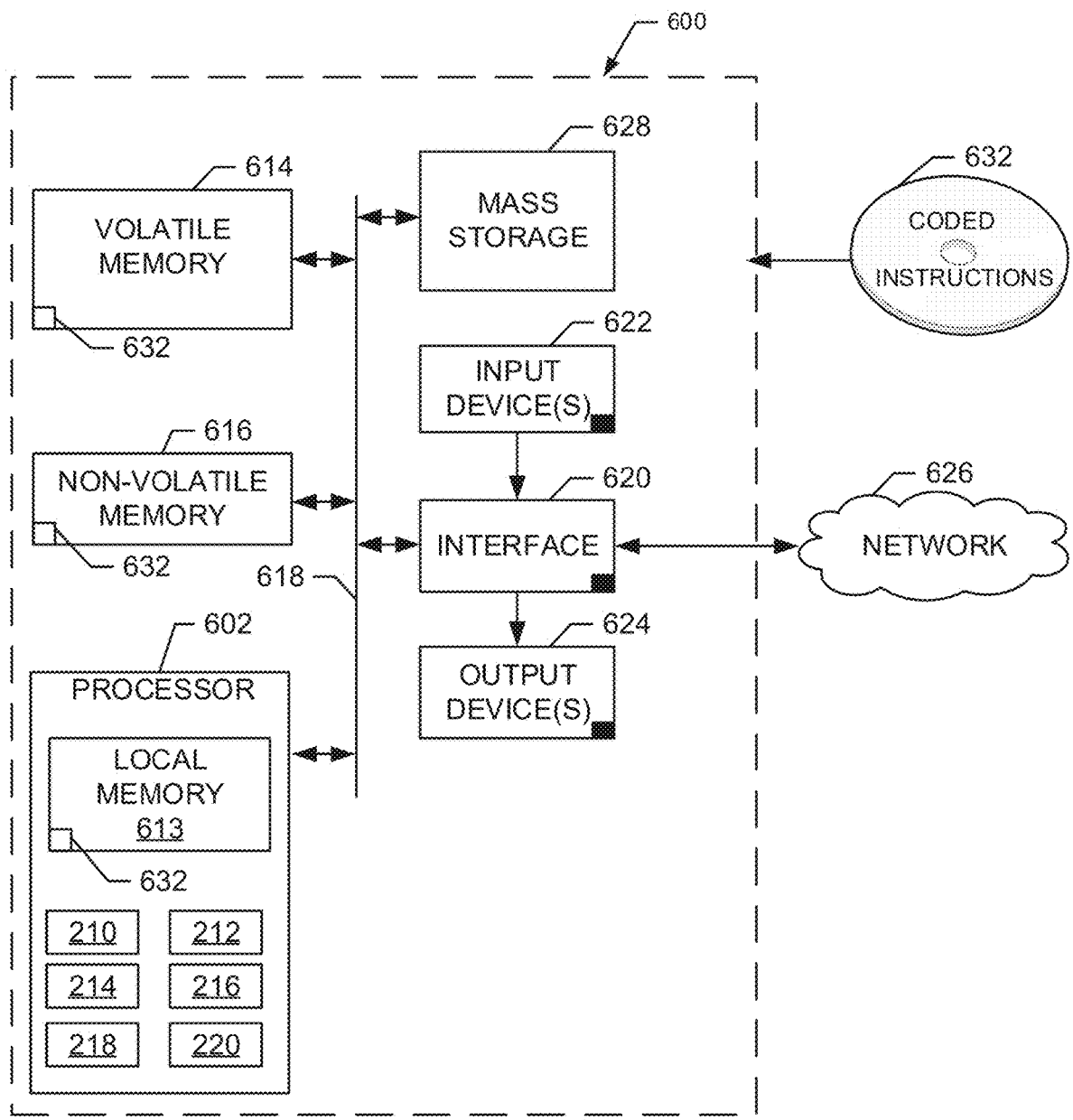
FIG. 6 is a block diagram of an example processing platform structured to execute the example machine-readable instructions of FIG. 4 to implement the example auditing device of FIGS. 1 and/or 2.

FIG. 6 is a block diagram of an example processor platform 600 structured to execute the instructions of FIG. 4 to implement the auditing device 102 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 600 implements the example workload analyzer 210, the example image analyzer 212, the example product identifier 214, the example results analyzer 216, the example message generator 218, and the example alert generator 220.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 4 may be stored in the mass storage device 628, in the volatile memory 614, in the non-volatile memory 616, and/or on a removable non-transitory computer readable storage medium such as a CD or DVD.

While an example manner of implementing the central server 104 of FIG. 1 is illustrated in FIGS. 1 and 3, one or more of the elements, processes and/or devices illustrated in FIGS. 1 and 3 may be combined, divided, re-arranged, omitted, eliminated and/or implemented in any other way. Further, the example workload authorizer 302, the example workload analyzer 304, the example product analyzer 306, the example message analyzer 308, the example alert analyzer 312, the example alert authorizer 318, the example product reference generator 320 and/or, more generally, the example central server 104 of FIGS. 1 and 3 may be implemented by hardware, software, firmware and/or any combination of hardware, software and/or firmware. Thus, for example, any of the example workload authorizer 302, the example workload analyzer 304, the example product analyzer 306, the example message analyzer 308, the example alert analyzer 312, the example alert authorizer 318, the example product reference generator 320 and/or, more generally, the example central server 104 of FIGS. 1 and 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example workload authorizer 302, the example workload analyzer 304, the example product analyzer 306, the example message analyzer 308, the example alert analyzer 312, the example alert authorizer 318, and the example product reference generator 320 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central server 104 of FIGS. 1 and 3 may include one or more elements, processes and/or devices in addition to, or instead of, those illustrated in FIGS. 1 and 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
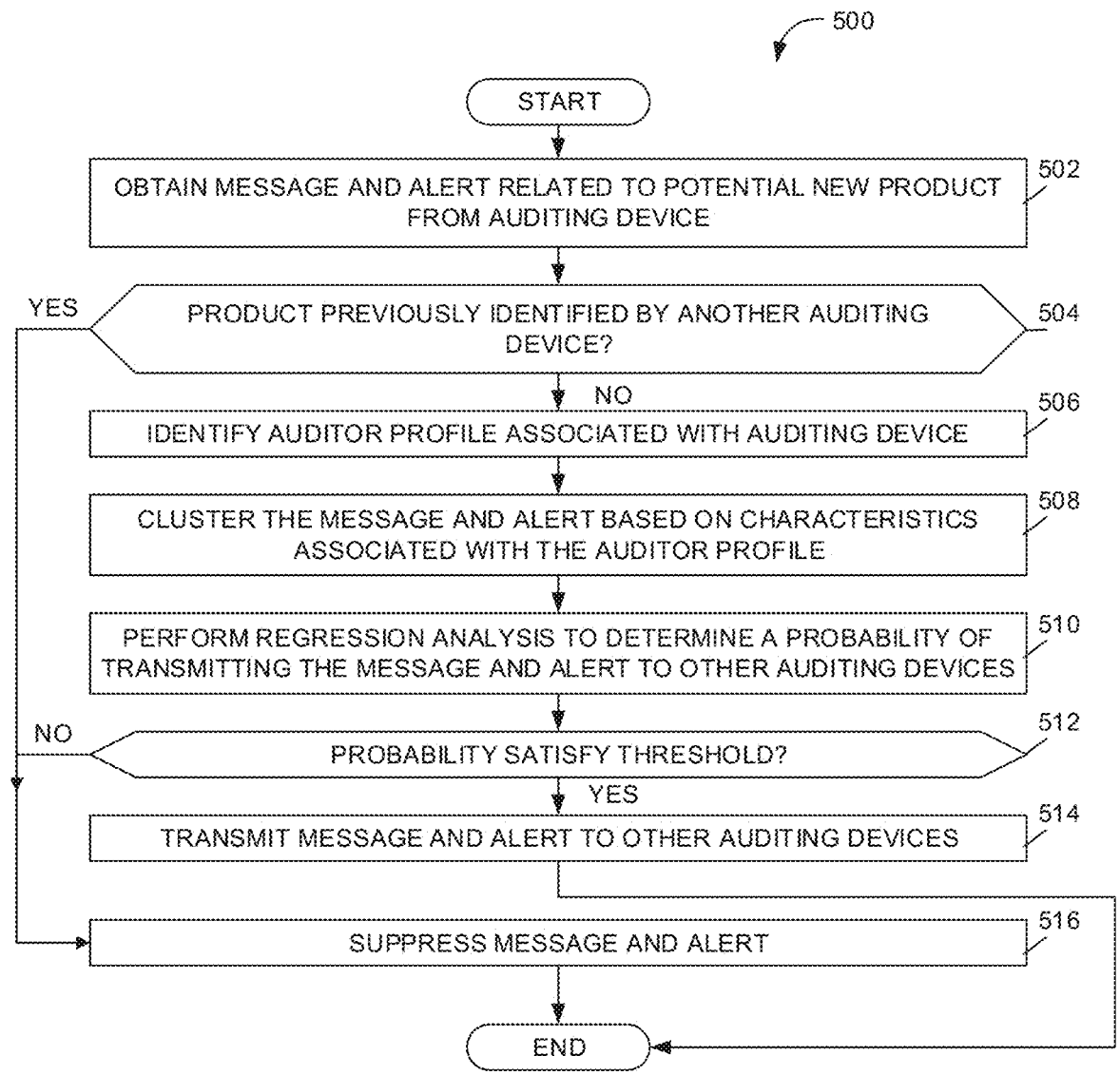
FIG. 5 is a flowchart representative of example machine readable instructions that may be executed by the example central server of FIGS. 1 and/or 3.

A flowchart representative of example hardware logic, machine readable instructions, hardware implemented state machines, and/or any combination thereof for implementing the central server 104 is shown in FIG. 5. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5, many other methods of implementing the example central server 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example machine readable instructions that may be executed to implement the central server 104 of FIGS. 1 and/or 3 are illustrated in FIG. 5. With reference by example to FIG. 3, the example machine readable instructions (e.g., process 500) of FIG. 5 begin when the workload analyzer 304 obtains message and alert data related to potential new product from the auditing device 102 (block 502). The example product analyzer 304 determines if the product was previously identified by another auditing device 102 (block 504). For example, the product analyzer 306 obtains an indication from the workload analyzer 304 that the product is a part of another auditing device workload, or the product analyzer 306 identifies a reference product image in the image database 106 that matches the product image. If the example product analyzer 306 determines that the product was previously identified (block 504), the alert authorizer 318 suppresses the message and alert (block 516). If the product analyzer 306 determines that the product has not been previously identified (block 504), the alert analyzer 312 identifies an auditor profile associated with the auditing device 102 (block 506). The alert analyzer 312 clusters the message and alert data based on characteristics associated with the auditor profile (block 508). The alert analyzer 312 performs regression analysis to determine a probability of transmitting the message and alert data to other auditing devices 102 (block 510). The alert authorizer 318 determines whether the probability satisfies a threshold (block 512). If the alert authorizer 318 determines that the probability does not satisfy the threshold (block 512), the alert authorizer 318 suppresses the message and alert (block 516). If the alert authorizer 318 determines that the probability satisfies the threshold (block 512), the alert authorizer 318 transmits the message and alert to other auditing devices 102 (block 514). In some examples, the process 500 ends until another message and/or alert is to be processed.

Figure 7:
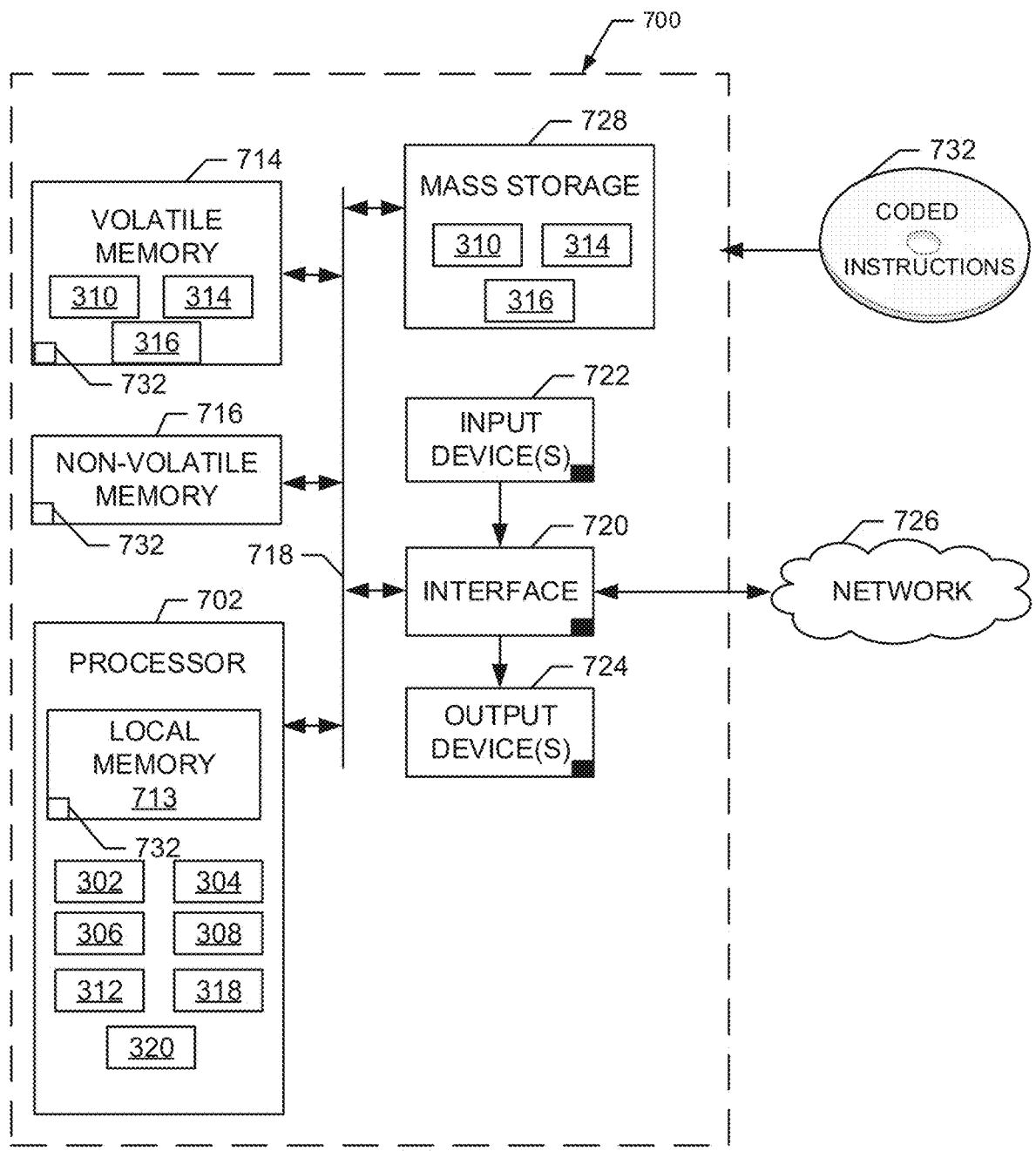
FIG. 7 is a block diagram of an example processing platform structured to execute the example machine-readable instructions of FIG. 5 to implement the example central server of FIGS. 1 and/or 3.

FIG. 7 is a block diagram of an example processor platform 700 structured to execute the instructions of FIG. 5 to implement the central server 104 of FIGS. 1 and/or 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 700 implements the example workload authorizer 302, the example workload analyzer 304, the example product analyzer 306, the example message analyzer 308, the example alert analyzer 312, the example alert authorizer 318, and the example product reference generator 320.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus, systems and articles of manufacture have been disclosed that monitor auditing devices to suppress or transmit alert data. The disclosed examples improve the efficiency of using a computing device by suppressing alert data that is ineffective to reduce an amount of resources (e.g., network, storage, computational, personnel, etc.) required for subsequent processing. The disclosed methods, apparatus and articles of manufacture are accordingly directed to one or more improvement(s) in the functioning of a computer.

The following paragraphs provide various examples of the examples disclosed herein Example 1 can be a workload analyzer to obtain alert data related to a potential new product from an auditing device, a product analyzer to identify a product within the alert data to determine if the product has been previously identified by another auditing device; in response to determining that the product has not been previously identified, an alert analyzer to: cluster the alert data based on characteristics associated with an auditor profile of the auditing device, and determine a probability of transmitting the alert data to other auditing devices based on the clustered alert data; and an alert authorizer to suppress the alert data from being transmitted to the other auditing devices to reduce an amount of network resources required for subsequent processing when the probability does not satisfy a threshold.

Example 2 includes the apparatus of example 1, wherein the workload analyzer is to determine if the product is associated with another workload of one of the other auditing devices, the workload analyzer to transmit the determination to the alert authorizer to suppress the alert data from being transmitted.

Example 3 includes the apparatus of any one of examples 1-2, further including a message analyzer to: parse messages from e other auditing devices to determine if the product has been previously identified, and transmit an indication message to the product analyzer indicating whether or not the product has been identified in the messages from the other auditing devices.

Example 4 includes the apparatus of any one of examples 1-3, wherein the characteristics associated with the auditor profile of the auditing device include at least one of a number of years of experience, a skill level, an efficiency measure, an average amount of time to perform an audit, an alert data generation measure, or a number of stock keeping units (SKU).

Example 5 includes the apparatus of any one of examples 1-4, wherein including the alert analyzer is to perform a logistic regression to determine the probability of transmitting the alert data to other auditing devices.

Example 6 includes the apparatus of any one of examples 1-5, wherein the alert analyzer is to perform the logistic regression to learn coefficients associated with a cluster index.

Example 7 includes the apparatus of any one of examples 1-6, wherein the alert authorizer is to transmit the alert data to the other auditing devices when the probability satisfies the threshold to reduce an amount of network resources required to process subsequent alert data.

Example 8 can be a non-transitory computer readable medium comprising instructions that, when executed, cause a machine to at least obtain alert data related to a potential new product from an auditing device, identify a product within the alert data to determine if the product has been previously identified by another auditing device; in response to determining that the product has not been previously identified: cluster the alert data based on characteristics associated with an auditor profile of the auditing device, and determine a probability of transmitting the alert data to other auditing devices based on the clustered alert data, and suppress the alert data from being transmitted to the other auditing devices to reduce an amount of network resources required for subsequent processing when the probability does not satisfy a threshold.

Example 9 includes the non-transitory computer readable medium of example 8, wherein the instructions further cause the machine to determine if the product is associated with another workload of one of the other auditing devices, and transmit the determination to suppress the alert data from being transmitted.

Example 10 includes the non-transitory computer readable medium of any one of examples 8-9, wherein the instructions further cause the machine to: parse messages from the other auditing devices to determine if the product has been previously identified; and transmit an indication message indicating whether or not the product has been identified in the messages from the other auditing devices.

Example 11 includes the non-transitory computer readable medium of any one of examples 8-10, wherein the characteristics associated with the auditor profile of the auditing device include at least one of a number of years of experience, a skill level, an efficiency measure, an average amount of time to perform an audit, an alert data generation measure, or a number of stock keeping units (SKU).

Example 12 includes the non-transitory computer readable medium of any one of examples 8-11, wherein the instructions further cause the machine to perform a logistic regression to determine the probability of transmitting the alert data to other auditing devices.

Example 13 includes the non-transitory computer readable medium of any one of examples 8-12, wherein the performing of the logistic regression is to learn coefficients associated with a cluster index.

Example 14 includes the non-transitory computer readable medium of any one of examples 8-13, wherein the instructions further cause the machine to transmit the alert data to the other auditing devices when the probability satisfies the threshold to reduce an amount of network resources required to process subsequent alert data.

Example 15 can be obtaining, by executing an instruction with a processor, alert data related to a potential new product from an auditing device, identifying, by executing an instruction with the processor, a product within the alert data to determine if the product has been previously identified by another auditing device; in response to determining that the product has not been previously identified: clustering, by executing an instruction with the processor, the alert data based on characteristics associated with an auditor profile of the auditing device, and determining, by executing an instruction with the processor, a probability of transmitting the alert data to other auditing devices based on the clustered alert data, and suppressing, by executing an instruction with the processor, the alert data from being transmitted to the other auditing devices to reduce an amount of network resources required for subsequent processing when the probability does not satisfy a threshold.

Example 16 includes the method of example 15, further including determining if the product is associated with another workload of one of the other auditing devices, and transmitting the determination to suppress the alert data from being transmitted.

Example 17 includes the method of any one of examples 15-16, further including: parsing messages from the other auditing devices to determine if the product has been previously identified, and transmitting an indication message indicating whether or not the product has been identified in the messages from the other auditing devices.

Example 18 includes the method of any one of examples 15-17, wherein the characteristics associated with the auditor profile of the auditing device include at least one of a number of years of experience, a skill level, an efficiency measure, an average amount of time to perform an audit, an alert data generation measure, or a number of stock keeping units (SKU).

Example 19 includes the method of any one of examples 15-18, further including performing a logistic regression to determine the probability of transmitting the alert data to other auditing devices, the logistic regression to learn coefficients associated with a cluster index.

Example 20 includes the method of any one of examples 15-19, further including transmitting the alert data to the other auditing devices when the probability satisfies the threshold to reduce an amount of network resources required to process subsequent alert data.

Example 21 can be means for analyzing a workload to obtain alert data related to a potential new product from an auditing device, means for analyzing a product to identify a product within the alert data to determine if the product has been previously identified by another auditing device; in response to determining that the product has not been previously identified, means for analyzing an alert to: cluster the alert data based on characteristics associated with an auditor profile of the auditing device, and determine a probability of transmitting the alert data to other auditing devices based on the clustered alert data, and means for authorizing an alert to suppress the alert data from being transmitted to the other auditing devices to reduce an amount of network resources required for subsequent processing when the probability does not satisfy a threshold.

Example 22 includes the apparatus of example 21, wherein the workload analyzing means is to determine if the product is associated with another workload of one of the other auditing devices, the workload analyzing means to transmit the determination to the alert authorizing means to suppress the alert data from being transmitted.

Example 23 includes the apparatus of any one of examples 21-22, further including means for analyzing a message to: parse messages from the other auditing devices to determine if the product has been previously identified, and transmit an indication message to the product analyzing means to indicate whether or not the product has been identified in the messages from the other auditing devices.

Example 24 includes the apparatus of any one of examples 21-23, wherein the characteristics associated with the auditor profile of the auditing device include at least one of a number of years of experience, a skill level, an efficiency measure, an average amount of time to perform an audit, an alert data generation measure, or a number of stock keeping units (SKU).

Example 25 includes the apparatus of any one of examples 21-24, wherein the alert analyzing means is to perform a logistic regression to determine the probability of transmitting the alert data to other auditing devices.

Example 26 includes the apparatus of any one of examples 21-25, wherein the alert analyzing means is to perform the logistic regression to learn coefficients associated with a cluster index.

Example 27 includes the apparatus of any one of examples 21-26, wherein the alert authorizing means is to transmit the alert data to the other auditing devices when the probability satisfies the threshold to reduce an amount of network resources required to process subsequent alert data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   product analyzing circuitry to:
      identify a product represented by the alert data obtained from a first auditing device; and
      determine if the product has been previously identified;
   alert analyzing circuitry to, in response to a determination that the product has not been previously identified:
      determine a first probability of transmitting the alert data to a second auditing device, the first probability associated with a first cluster, the first cluster based on a first characteristic of a first auditor profile of the first auditing device; and
      determine a second probability of transmitting the alert data to a third auditing device, the second probability associated with a second cluster, the second cluster based on a second characteristic of the first auditor profile, the first characteristic and the second characteristic independent of the alert data, the first characteristic different from the second characteristic; and
   alert authorizing circuitry to:
      reduce an amount of network resources required for subsequent processing by suppressing the alert data from being transmitted to the second auditing device when the first probability does not satisfy a threshold, the second auditing device associated with a second auditor profile sharing the first characteristic with the first auditor profile; and
      cause transmission of the alert data to the third auditing device when the second probability satisfies the threshold, the third auditing device associated with a third auditor profile sharing the second characteristic with the first auditor profile.

2. The apparatus of claim 1, further including workload analyzing circuitry to:
   determine if the product is associated with a workload of one of the second auditing device or the third auditing device; and
   suppress transmission of the alert data to the second auditing device and the third auditing device in response to the product being associated with the workload.

3. The apparatus of claim 1, further including message analyzing circuitry to:
   parse a message from one of the second auditing device or the third auditing device to determine if the product has been previously identified; and
   indicate whether the product has been identified in the message from the one of the second auditing device or the third auditing device.

4. The apparatus of claim 1, wherein one or more of the first characteristic or the second characteristic includes at least one of a number of years of experience, a skill level, an efficiency measure, an average amount of time to perform an audit, or a number of stock keeping units (SKU).

5. The apparatus of claim 1, wherein the alert analyzing circuitry is to:
   determine the first probability via a first logistic regression; and
   determine the second probability via a second logistic regression.

6. The apparatus of claim 5, wherein the alert analyzing circuitry is to:
   determine, based on the first logistic regression, first coefficients associated with a first cluster index; and
   determine, based on the second logistic regression, second coefficients associated with a second cluster index.

7. The apparatus of claim 1, wherein the alert authorizing circuitry is to cause a central server to transmit the alert data to the third auditing device and a fourth auditing device when the second probability satisfies the threshold to reduce an amount of network resources required to process subsequent alert data, the fourth auditing device associated with a fourth auditor profile sharing the second characteristic with the first auditor profile.

8. A non-transitory computer readable medium comprising instructions that, when executed, cause at least one processor to at least:
   identify a product represented by alert data obtained from a first auditing device;
   determine if the product has been previously identified;
   in response to a determination that the product has not been previously identified:
      determine a first probability of transmitting the alert data to a second auditing device, the first probability associated with a first cluster, the first cluster based on a first characteristic of a first auditor profile of the first auditing device; and
      determine a second probability of transmitting the alert data to a third auditing device, the second probability associated with a second cluster, the second cluster based on a second characteristic of the first auditor profile, the first characteristic and the second characteristic independent of the alert data, the first characteristic different from the second characteristic;
   reduce an amount of network resources required for subsequent processing by suppressing the alert data from being transmitted to the second auditing device when the first probability does not satisfy a threshold, the second auditing device associated with a second auditor profile sharing the first characteristic with the first auditor profile; and
   cause transmission of the alert data to the third auditing device when the second probability satisfies the threshold, the third auditing device associated with a third auditor profile sharing the second characteristic with the first auditor profile.

9. The non-transitory computer readable medium of claim 8, wherein the instructions further cause the at least one processor to:
   determine if the product is associated with a workload of one of the second auditing device or the third auditing device; and
   suppress transmission of the alert data to the second auditing device and the third auditing device in response to the product being associated with the workload.

10. The non-transitory computer readable medium of claim 8, wherein the instructions further cause the at least one processor to:
   parse a message from one of the second auditing device or the third auditing device to determine if the product has been previously identified; and
   indicate whether the product has been identified in the message from the one of the second auditing device or the third auditing device.

11. The non-transitory computer readable medium of claim 8, wherein one or more of the first characteristic or the second characteristic includes at least one of a number of years of experience, a skill level, an efficiency measure, an average amount of time to perform an audit, or a number of stock keeping units (SKU).

12. The non-transitory computer readable medium of claim 8, wherein the instructions further cause the at least one processor to:
   determine the first probability via a first logistic regression; and
   determine the second probability via a second logistic regression.

13. The non-transitory computer readable medium of claim 12, wherein the instructions further cause the at least one processor to:
   determine, based on the first logistic regression, first coefficients associated with a first cluster index; and
   determine, based on the second logistic regression, second coefficients associated with a second cluster index.

14. The non-transitory computer readable medium of claim 8, wherein the instructions further cause the at least one processor to cause a central server to transmit the alert data to the third auditing device and a fourth auditing device when the second probability satisfies the threshold to reduce an amount of network resources required to process subsequent alert data, the fourth auditing device associated with a fourth auditor profile sharing the second characteristic with the first auditor profile.

15. A method comprising:
   identifying, by executing an instruction with a processor, a product represented by alert data obtained from a first auditing device;
   determining, by executing an instruction with the processor, if the product has been previously identified;
   in response to determining that the product has not been previously identified:
      determining, by executing an instruction with the processor, a first probability of transmitting the alert data to a second auditing device, the first probability associated with a first cluster, the first cluster based on a first characteristic of a first auditor profile of the first auditing device; and
      determining, by executing an instruction with the processor, a second probability of transmitting the alert data to a third auditing device, the second probability associate with a second cluster, the second cluster based on a second characteristic of the first auditor profile, the first characteristic and the second characteristic independent of the alert data, the first characteristic different from the second characteristic;
   reducing an amount of network resources required for subsequent processing by suppressing, by executing an instruction with the processor, the alert data from being transmitted to the second auditing device when the first probability does not satisfy a threshold, the second auditing device associated with a second auditor profile sharing the first characteristic with the first auditor profile; and
   causing transmission of, by executing an instruction with the processor, the alert data to the third auditing device when the second probability satisfies the threshold, the third auditing device associated with a third auditor profile sharing the second characteristic with the first auditor profile.

16. The method of claim 15, further including:
   determining if the product is associated with a workload of one of the second auditing device or the third auditing device; and
   suppressing transmission of the alert data to the second auditing device and the third auditing device in response to the product being associated with the workload.

17. The method of claim 15, further including:
parsing a message from one of the second auditing device or the third auditing device to determine if the product has been previously identified; and
causing transmission of an indication message indicating whether the product has been identified in the message from the one of the second auditing device or the third auditing device.

18. The method of claim 15, wherein one or more of the first characteristic or the second characteristic includes at least one of a number of years of experience, a skill level, an efficiency measure, an average amount of time to perform an audit, or a number of stock keeping units (SKU).

19. The method of claim 15, further including:
determining the first probability via a first logistic regression;
determining, from the first logistic regression, first coefficients associated with a first cluster index;
determining the second probability via a second logistic regression; and
determining, from the second logistic regression, second coefficients associated with a second cluster index.

20. The method of claim 15, further including transmitting, via a central server, the alert data to the third auditing device and a fourth auditing device when the second probability satisfies the threshold to reduce an amount of network resources required to process subsequent alert data, the fourth auditing device associated with a fourth auditor profile sharing the second characteristic with the first auditor profile.

21. An apparatus comprising:
at least one memory;
instructions; and
processor circuitry to execute the instructions to:
identify a product represented by alert data obtained from a first auditing device;
determine if the product has been previously identified devices;
in response to a determination that the product has not been previously identified:
determine a first probability of transmitting the alert data to a second auditing device, the first probability associated with a first cluster, the first cluster based on a first characteristic of a first auditor profile of the first auditing device; and
determine a second probability of transmitting the alert data to a third auditing device, the second probability associated with a second cluster, the second cluster based on a second characteristic of the first auditor profile, the first characteristic and the second characteristic independent of the alert data, the first characteristic different from the second characteristic;
reduce an amount of network resources required for subsequent processing by suppressing the alert data from being transmitted to the second auditing device when the first probability does not satisfy a threshold, the second auditing device associated with a second auditor profile sharing the first characteristic with the first auditor profile; and
cause transmission of the alert data to the third auditing device when the second probability satisfies the threshold, the third auditing device associated with a third auditing profile sharing the second characteristic with the first auditor profile.

22. The apparatus of claim 21, wherein the processor circuitry is to:
determine if the product is associated with a workload of one of the second auditing device or the third auditing device; and
suppress transmission of the alert data to the second auditing device and the third auditing device in response to the product being associated with the workload.

23. The apparatus of claim 21, wherein the processor circuitry is to:
parse a message from one of the second auditing device or the third auditing device to determine if the product has been previously identified; and
indicate whether the product has been identified in the message from the one of the second auditing device or the third auditing device.

24. The apparatus of claim 21, wherein one or more of the first characteristic or the second characteristic includes at least one of a number of years of experience, a skill level, an efficiency measure, an average amount of time to perform an audit, or a number of stock keeping units (SKU).

25. The apparatus of claim 21, wherein the processor circuitry is to:
determine the first probability via a first logistic regression; and
determine the second probability via a second logistic regression.

26. The apparatus of claim 25, wherein the processor circuitry is to:
determine, from the first logistic regression, first coefficients associated with a first cluster index; and
determine, from the second logistic regression, second coefficients associated with a second cluster index.

27. The apparatus of claim 21, wherein the processor circuitry is to cause a central server to transmit the alert data to the third auditing device and a fourth auditing device when the second probability satisfies the threshold to reduce an amount of network resources required to process subsequent alert data, the fourth auditing device associated with a fourth auditor profile sharing the second characteristic with the first auditor profile.

28. The apparatus of claim 1, wherein the product analyzing circuitry is to:
determine if a first image included in the alert data matches a second image included in a database of reference images; and
indicate whether the product has been identified based on whether the first image matches the second image.

29. The non-transitory computer readable medium of claim 8, wherein the instructions further cause the at least one processor to:
determine if a first image included in the alert data matches a second image included in a database of reference images; and
indicate whether the product has been identified based on whether the first image matches the second image.

30. The method of claim 15, further including:
determining if a first image included in the alert data matches a second image included in a database of reference images; and
indicating whether the product has been identified based on whether the first image matches the second image.

31. The apparatus of claim 21, wherein the processor circuitry is to:
- determine if a first image included in the alert data matches a second image included in a database of reference images; and
- indicate whether the product has been identified based on whether the first image matches the second image.

* * * * *